US008807387B2

(12) United States Patent
Montgelard

(10) Patent No.: US 8,807,387 B2
(45) Date of Patent: Aug. 19, 2014

(54) REMOVABLE HANDLE

(75) Inventor: Michel Montgelard, Aix les Bains (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 13/519,931

(22) PCT Filed: Dec. 27, 2010

(86) PCT No.: PCT/FR2010/052924
§ 371 (c)(1),
(2), (4) Date: Sep. 25, 2012

(87) PCT Pub. No.: WO2011/080482
PCT Pub. Date: Jul. 7, 2011

(65) Prior Publication Data
US 2013/0140321 A1    Jun. 6, 2013

(30) Foreign Application Priority Data
Dec. 31, 2009   (FR) ...................................... 09 59686

(51) Int. Cl.
*A47J 36/00* (2006.01)
*A47J 45/07* (2006.01)

(52) U.S. Cl.
CPC ..................................... *A47J 45/07* (2013.01);
*A47J 45/071* (2013.01)
USPC ........ 220/759; 220/573.1; 220/752; 220/757; 220/762; 220/769

(58) Field of Classification Search
USPC .............. 220/573.1, 752, 757, 759, 762, 768, 220/769, 912
See application file for complete search history.

(56) References Cited

U.S. PATENT DOCUMENTS

| | | | |
|---|---|---|---|
| 3,232,657 A | 2/1966 | Thompson et al. | |
| 5,704,092 A * | 1/1998 | Nicollet et al. | 16/425 |
| 6,000,100 A * | 12/1999 | Montgelard | 16/425 |
| 6,257,439 B1 * | 7/2001 | Hsu | 220/759 |
| 6,318,776 B1 | 11/2001 | Lee | |
| 6,439,420 B1 * | 8/2002 | Park | 220/759 |
| 7,883,129 B2 * | 2/2011 | Jung et al. | 294/34 |
| 2008/0110910 A1 | 5/2008 | Kleppin | |
| 2009/0045207 A1 * | 2/2009 | Lorthioir | 220/759 |

FOREIGN PATENT DOCUMENTS

EP    1378195 A1    1/2004

* cited by examiner

*Primary Examiner* — Fenn Mathew
*Assistant Examiner* — Madison L Poos
(74) *Attorney, Agent, or Firm* — The Webb Law Firm

(57) ABSTRACT

Provided is a removable handle for a kitchen object, having a lateral wall extending upwardly by a part that is curved back towards the outside, the handle comprising an inner jaw and an outer jaw to be respectively brought against the inner and outer surfaces of the lateral wall, the two jaws being mobile in relation to each other between an open position and a closed position wherein they pinch the lateral wall. The outer jaw comprises a groove that can receive the free end of the curved part of the lateral wall in abutment when the jaws are in the closed position thereof.

20 Claims, 2 Drawing Sheets

REMOVABLE HANDLE

BACKGROUND OF THE INVENTION

1. Field of the Invention

This invention relates to a removable handle for a kitchen accessory, a kitchen accessory such as a pan, having a lateral wall that extends upwardly by an outwardly curved portion.

2. Prior Art

Numerous handles for kitchen accessories are known, of the type including an internal jaw and an external jaw suitable for abutting the internal and external surfaces, respectively, of the lateral wall of the kitchen accessory, in which the two jaws are mobile one with respect to the other between an open position and a closed position in which they clamp the lateral wall.

Such a handle also includes jaw actuation means, which means can be varied and, in general, their design is associated with an improvement in ergonomics.

In addition, some handles have technical features enabling specific technical problems to be solved, for example: preventing from a sudden and unexpected opening of the jaws in spite of the stability of their closed position, the possibility of clamping lateral walls of kitchen accessories of different thicknesses, keeping jaws immobile in the closed position adjusted to suit the thickness of the lateral wall of the kitchen accessory.

However, all of these handles have the disadvantage of having a rotary clearance according to the longitudinal axis of the grip body of the handle.

SUMMARY OF THE INVENTION

This invention aims to provide a handle in which the relative rotary clearance of a container with respect to the handle according to the axis corresponding to the longitudinal direction of the handle is considerably reduced, and even eliminated.

According to the invention, the external jaw of the handle of the type mentioned above comprises a groove suitable for receiving, in abutment, the free end of the curved portion of the lateral wall of the kitchen accessory when the jaws are in their closed position.

In this way, there are at least three areas of contact between the wall and the kitchen accessory: a first area between the internal surface of the lateral wall and the internal jaw of the handle, a second area between the external surface of the lateral wall and the external jaw of the handle, and a third area between the free end of the curved portion extending the lateral wall and the groove produced in the external jaw of the handle. The first two contact areas are typically vertically aligned, and the third is generally extended over a horizontal surface.

Because of the presence of three contact areas (not aligned), the clearance between the kitchen accessory and the handle is significantly reduced, and even zero.

BRIEF DESCRIPTION OF THE DRAWINGS

Other specific features and advantages of this invention will become clear in the following description of the embodiment provided as a non-limiting example and illustrated in the appended drawings, in which.

DETAILED DESCRIPTION OF THE INVENTION AND BEST MODE

Figure 1:
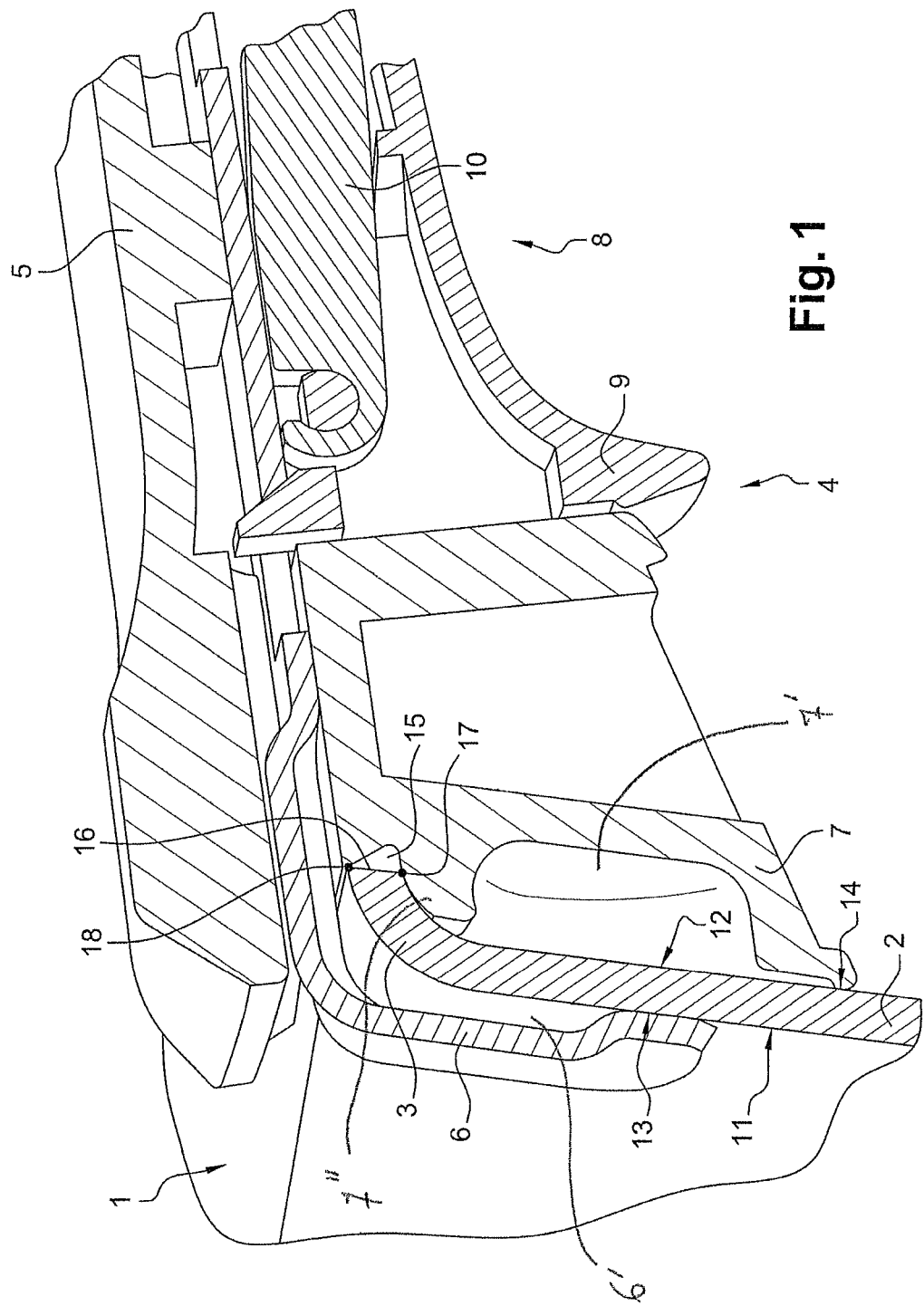
FIG. 1 shows a cross-section of the front portion of a handle according to this invention clamping a cooking utensil.
Figure 2:
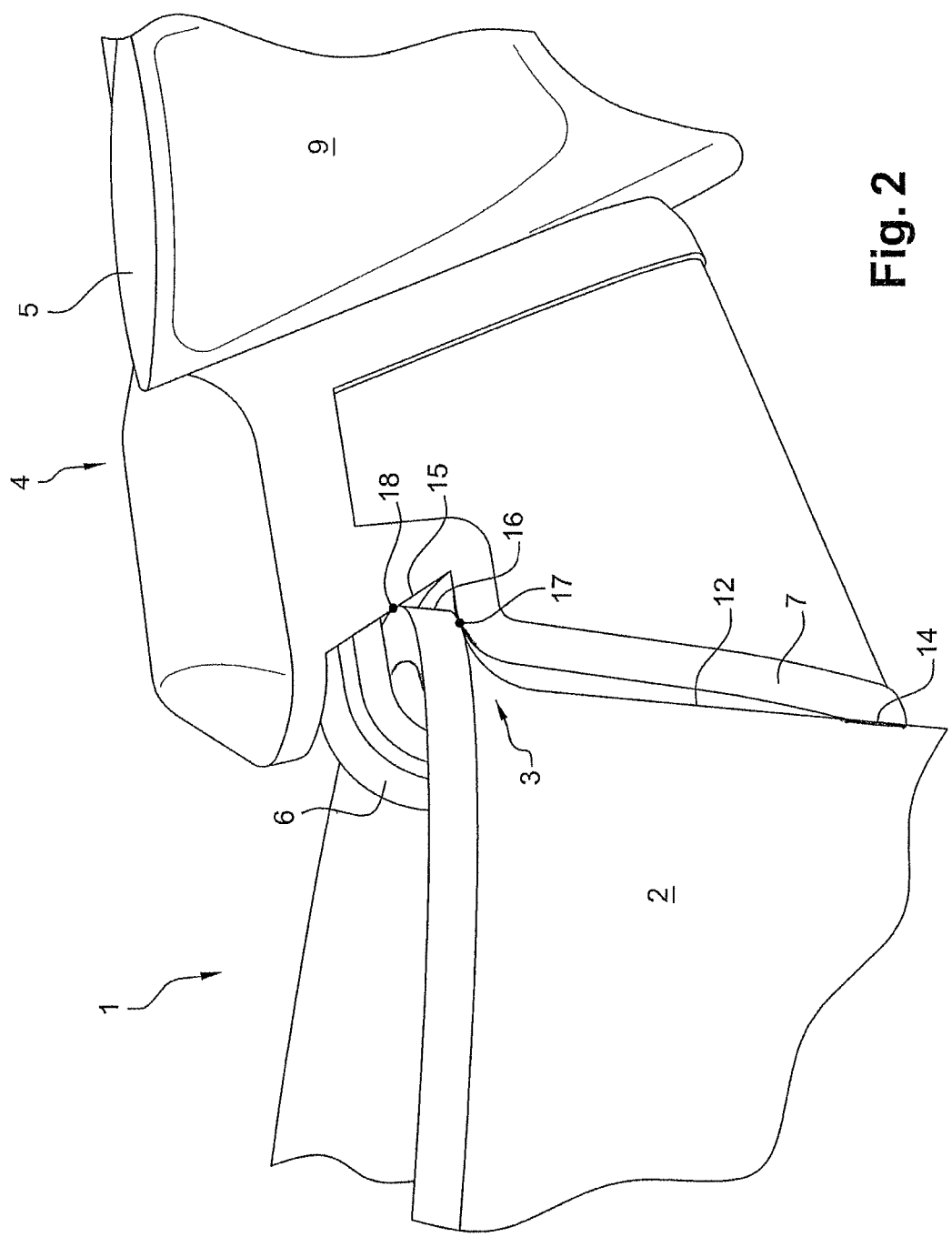
FIG. 2 shows a perspective view corresponding to FIG. 1.

Conventionally, a kitchen accessory 1 includes a horizontal base wall, a lateral wall 2 standing up from the base wall, and a curved portion 3 that is curved outwardly, which extends the lateral wall 2, which defines the upper opening of the kitchen accessory 1 and which forms the upper end of the latter.

In parallel, a removable handle 4 includes a grip body 5 that acts as a stick and that enables a user to grasp it, and two jaws 6, 7 that are mobile one with respect to the other between an open position enabling the lateral wall 2 to be arranged between the jaws 6, 7 and a closed position in which the jaws 6, 7 clamp the lateral wall 2. The removable handle 4 also includes actuation means 8 that can be moved by the user and drive the relative movement of the two jaws 6, 7. In this case, these means 8 are mobile between an opening position in which the jaws 6, 7 are in their open position, and a closing position in which the jaws 6, 7 are in their closed position. More specifically, in this example, the actuation means 8 include a lever 9 that is mounted in rotation on the grip body 5 and a connecting rod 10 that is pivotably mounted with respect to the lever 9 and with respect to one of the jaws which is mobile.

The two jaws 6, 7 are formed by an internal jaw 6 that is suitable for abutting the internal surface 11 of the lateral wall 2 of the kitchen accessory 1, and an external jaw 7 that is suitable for abutting the external surface 12 of this same wall 2. Thus, when the jaws 6, 7 are in the closed position, they are in contact with the lateral wall 2, on each side of the latter. More specifically, each jaw 6, 7 includes a clamping surface 13, 14 that is the portion of the jaw 6, 7 suitable for coming into contact with the lateral wall 2 of the kitchen accessory 1.

In this embodiment, the external jaw 7 is securely mounted on the grip body 5, and the internal jaw 6 is movably mounted with respect to the latter (in this case, the internal jaw 6 is mounted in translation substantially according to the longitudinal direction of the grip body 5, and, in this case, it is connected to the connecting rod 10).

According to this invention, the external jaw 7 comprises a groove 15 that is suitable, when the jaws 6, 7 are in their closed position, for receiving, in abutment, the free end 16 of the curved portion 3. More specifically, this groove 15 is arranged above the clamping surface 14 of the external jaw 7. In this example, the groove 15 is located between 10 and 15 mm of the clamping surface 13 of the internal jaw 6, and between 20 and 25 mm of the clamping surface 14 of the external jaw 7.

There are thus at least three areas of contact between the handle 4 and the kitchen accessory 1: a first area between the internal surface 11 of the lateral wall 2 and the clamping surface 13 of the internal jaw 6 of the handle 4, a second area between the exterior surface 12 of the lateral wall 2 and the clamping surface 14 of the external jaw 7 of the handle 4, and a third area between the free end 16 of the curved portion 3 extending the lateral wall 2 and the groove 15 produced in the external jaw 7 of the handle 4. The first two contact areas are arranged substantially over a vertical generatrix line of the lateral wall 2 of the kitchen accessory 1. More specifically, located on this vertical generatrix line are: a first contact area on the vertical generatrix line at a level inferior compared with a vertical axis defined by the generatrix and the second contact area at an intermediate level on said vertical axis. In addition, the third contact area, not located on this vertical generatrix line, is located at a level superior to the intermediate level, along the vertical axis defined by this generatrix. In other words, the handle 4 and the kitchen accessory 1 are in contact only in localized areas 13, 14 and this localized areas 13, 14 are at least two in addition to the areas of contact of the external and internal edges and the groove 15. The profiles of the first two contact areas are substantially linear. Their surfaces are several mm². Advantageously, in order to limit the surface of the contact areas, FIG. 1 shows: a cavity 7' located in the external jaw 7 of the handle 4, between the clamping surface 14 of the external jaw 7 and the groove 15, a cavity 6' located in the internal jaw 6 of the handle 4, extending from the clamping surface 13 for clamping the internal jaw 6, on the one hand, and beyond the groove 15, on the other hand, and a projection 7" between the groove 15 and the cavity 7' separating them, so as to optimally receive the free end 16 of the curved portion 3. Consequently, the three contact areas are localized, i.e. they have limited surfaces, non-continuous over the height of the internal 11 and external 12 surfaces of the lateral wall 2. This implies the existence of cavities.

The groove 15 extends longitudinally according to the horizontal tangent on the lateral wall 2 (or the curved portion 3) of the clamped kitchen accessory 1 (in this case, the groove 15 extends longitudinally perpendicularly to the direction of translation of the mobile jaw 6). The groove 15 extends over the entire width of the external jaw 7 (typically between 20 and 40 mm, or even more).

This groove 15 is shaped so as to receive, in abutment, when the jaws 6, 7 are in their closed position, the external 17 and internal 18 edges defining the thickness of the free end 16 of the curved portion 3.

In use, when the user dives the movement means 8 (in this case, the lever 9) from their opening position to their closing position, the jaws 6, 7 pass from their open position to a closed position, passing through a position of contact from which the lateral wall 2 is in contact with the two jaws 6, 7.

From this position, the clamping surface 13 of the internal jaw 6 presses the lateral wall 2 against the clamping surface 14 of the external jaw 7 and, simultaneously, drives the free end 16 of the curved portion 3 (which may already be in the groove 15), to the base of the groove 15 until it abuts the groove 15 and forms the third contact area (more specifically, until the two edges 17, 18 defining the free end 16 abut the groove 15).

The clamping force for clamping the kitchen accessory 1 is comparable to the one of handles of the prior art, and it is typically between 100 and 200 N.

In this case, to be capable of being used, regardless of the thickness of the free end 16 of the curved portion 3, the profile of the end of the groove 15, in the direction of its base, has a V shape. Thus, the finer the free end 16 is, the more deeply it will penetrate the groove 15 by being pressed against the base of the latter. In other words, the groove 15 preferably has an outwardly-flared shape. It will thus preferably be capable of blocking any translation movement, at least vertical, of the free end 16 when the external 17 and internal 18 edges defining the thickness of the free end 16 of the curved portion 3 are received in abutment in the groove 15, regardless of its thickness, thus avoiding the existence of clearance.

In addition, the kitchen accessory 1 has a certain diameter which corresponds to the respective curves of its lateral wall 2 and its curved portion 3. The jaws 6, 7 (more specifically, the clamping surfaces 13, 14 of the jaws 6, 7 and the groove 15 of the external jaw 7) can also have a non-zero curvature, and the curvature of the groove 15 may be different from the one of the clamping surface 14 of the external jaw 7.

When the curvature of the groove 15 is smaller than the one of the curved portion 3 of the clamped kitchen accessory, the free end 16 of the curved portion 3 comes into contact in a single area substantially in the same plane as the two contact areas formed by the two clamping surfaces 13, 14 (more specifically, at two very close points corresponding to the contacts produced by the external 17 and internal 18 edges defining the free end 16 of the curved portion 3). In such a case, a pivoting clearance may remain between the kitchen accessory 1 and the removable handle 4 according to the vertical plane passing through these contact areas.

By contrast, when the curvature of the groove 15 is greater than the one of the curved portion 3 of the clamped cookware 1, the free end 16 of the curved portion 3 comes into contact in two areas horizontally spaced apart from one another, which are arranged substantially at the two longitudinal ends of the groove 15 (more specifically, at four points very close to one another in pairs, corresponding to the contacts produced by the external 17 and internal 18 edges defining the free end 16 of the curved portion 3). In such a case, there are four non-coplanar contact areas, preventing any pivoting clearance.

It is also possible for the curvature of the groove 15 to be equal to the one of the curved portion 3 of the clamped kitchen accessory 1, in which case the free end 16 of the curved portion 3 comes into linear contact over the entire length of the groove 15, also preventing from any pivoting clearance.

This invention is not limited to the embodiment described above. It would be possible for the handle to have different movement means, or for it to alternatively, or cumulatively, have means making the open and closed positions of the jaws stable, means preventing from a sudden and unexpected opening of the jaws in spite of the stability of their closed position, means for deactivating the means preventing from the sudden and unforeseen opening of the jaws, means enabling the closed position of the jaws to be adjusted to the thickness of the lateral wall of the clamped kitchen accessory, and/or means holding the jaws immobile in the closed position adjusted to the thickness of the lateral wall of the kitchen accessory.

The invention claimed is:

1. A removable handle for a kitchen accessory having a lateral wall that is extended upwardly by an outwardly curved portion, in which the handle includes an internal jaw and an external jaw suitable for abutting internal and external surfaces, respectively, of the lateral wall of the kitchen accessory, in which the two jaws are mobile one with respect to the other between an open position and a closed position in which they clamp the lateral wall, and the external jaw comprises a groove suitable for receiving, in abutment, a free end of the curved portion of the lateral wall of the kitchen accessory when the jaws are in their closed position, wherein said groove is shaped so as to receive, in abutment, when the jaws are in their closed position, external and internal edges defining a thickness of the free end of the lateral wall at the location of said curved portion, the groove having an outwardly-flared shape blocking, at least vertically, the free end when the external and internal edges defining the thickness of the free end of the curved portion are received in abutment in the groove.

2. The removable handle according to claim 1, wherein the groove is capable of blocking the curved portion of the lateral wall of the kitchen accessory regardless of the thickness of said curved portion.

3. The removable handle according to claim 2, wherein a profile of an end of the groove in a direction of its base has a V shape.

4. The removable handle according to claim 2, wherein the external jaw is stationary with respect to a grip body of the handle.

5. The removable handle according to claim 2, wherein the internal jaw is mounted in translation according to a longitudinal direction of a grip body of the handle.

6. The removable handle according to claim 2, wherein the handle and the kitchen accessory are in contact only in localized areas and the localized areas are at least two in addition to areas of contact of the external and internal edges and the groove.

7. The removable handle according to claim 1, wherein a profile of an end of the groove in a direction of its base has a V shape.

8. The removable handle according to claim 7, wherein the external jaw is stationary with respect to a grip body of the handle.

9. The removable handle according to claim 7, wherein the internal jaw is mounted in translation according to a longitudinal direction of a grip body of the handle.

10. The removable handle according to claim 7, wherein the handle and the kitchen accessory are in contact only in localized areas and the localized areas are at least two in addition to areas of contact of the external and internal edges and the groove.

11. The removable handle according to claim 1, wherein the external jaw is stationary with respect to a grip body of the handle.

12. The removable handle according to claim 11, wherein the internal jaw is mounted in translation according to a longitudinal direction of a grip body of the handle.

13. The removable handle according to claim 11, wherein the handle and the kitchen accessory are in contact only in localized areas and the localized areas are at least two in addition to areas of contact of the external and internal edges and the groove.

14. The removable handle according to claim 1, wherein the internal jaw is mounted in translation according to a longitudinal direction of a grip body of the handle.

15. The removable handle according to claim 1, wherein the handle and the kitchen accessory are in contact only in localized areas and the localized areas are at least two in addition to areas of contact of the external and internal edges and the groove.

16. The removable handle according to claim 1, wherein contacts of the internal jaw and the external jaw against the internal and external surfaces, respectively, of the lateral wall of the kitchen accessory each have a surface area of several $mm^2$.

17. A removable handle and kitchen accessory having a lateral wall that is extended upwardly by an outwardly curved portion, which ends in a free end defined by external and internal edges of said lateral wall defining a thickness of the lateral wall at a location of said curved portion, the handle including an internal jaw and an external jaw abutting internal and external surfaces, respectively, of the lateral wall of the kitchen accessory, the two jaws are mobile one with respect to the other between an open position and a closed position in which they clamp the lateral wall, and the external jaw comprises a groove receiving, in abutment, a free end of the curved portion of the lateral wall of the kitchen accessory when the jaws are in their closed position, wherein said groove receives, in abutment, when the jaws are in their closed position, external and internal edges of the curved portion of said lateral wall which ends outwardly and wherein said groove has an outwardly-flared shape blocking, at least vertically, the free end when the external and internal edges defining the thickness of the free end of the curved portion are received in abutment in the groove.

18. The removable handle and kitchen accessory according to claim 17, wherein the groove is capable of blocking the curved portion of the lateral wall of the kitchen accessory regardless of the thickness of said curved portion.

19. The removable handle and kitchen accessory according to claim 17, wherein a profile of an end of the groove in a direction of its base has a V shape.

20. The removable handle and kitchen accessory according to claim 17, wherein the external jaw is stationary with respect to a grip body of the handle.

* * * * *